United States Patent

Okawara

[11] 4,064,831
[45] Dec. 27, 1977

[54] DEVICE FOR COATING GRANULAR SOLIDS

[75] Inventor: Kahei Okawara, Shizuoka, Japan

[73] Assignee: Ohkawara Mfg., Co., Ltd., Shizuoka, Japan

[21] Appl. No.: 772,778

[22] Filed: Feb. 28, 1977

[30] Foreign Application Priority Data

Feb. 27, 1976 Japan .................................. 51-21335

[51] Int. Cl.$^2$ .......................... B05B 17/00; B05C 3/08
[52] U.S. Cl. .................. 118/303; 23/313 R; 51/164; 134/134; 241/171
[58] Field of Search .................. 118/19, 418, 303; 51/164; 241/171, 176–179, 284; 23/313, 313 AS, 314; 209/11; 427/3, 242; 134/133, 134

[56] References Cited

U.S. PATENT DOCUMENTS

| 847,436 | 3/1907 | Preiffer | 51/164 X |
| 2,308,420 | 1/1943 | Hoopes | 118/19 X |
| 2,418,934 | 4/1947 | Hirsch | 118/19 X |
| 3,101,040 | 8/1963 | Lanz | 118/303 X |
| 3,145,162 | 8/1964 | Caipen | 209/11 |
| 3,442,691 | 5/1969 | Pearson | 427/242 |
| 3,973,518 | 8/1976 | Volkers et al. | 427/242 X |

FOREIGN PATENT DOCUMENTS

| 2,251,270 | 6/1975 | France | 118/19 |
| 330,061 | 8/1930 | United Kingdom | 241/171 |

*Primary Examiner*—Morris Kaplan
*Attorney, Agent, or Firm*—Armstrong, Nikaido & Marmelstein

[57] ABSTRACT

A device for coating granular solids has a rotary drum and a casing or housing air-tightly housing the rotary drum. The space between the rotary drum and the casing is divided by sealing means into a gas supply passage and a gas exhaust passage which in turn are communicated with a gas supply duct and a gas exhaust duct, respectively. The rotary drum is of a double-cone structure consisting of a cylindrical section and frustoconical side walls, and the cylindrical section consists of a plurality of circumferentially arcuated louvers overlapped one upon another and radially spaced apart from each other at a suitable distance to define gas passages between the interior and exterior of the rotary drum. The circumferential length of each louver and the spacing therebetween are so determined that upon rotation of the rotary drum in one or processing direction the discharge of process solids through the louver passages may be prevented whereas upon rotation in the other or discharge direction the coated solids may be automatically discharged out of the rotary drum through the louver passages. One of the side walls is formed with an inspection and batch charging opening, and no component part such as a coating material supply pipe is placed in the space communicating between the opening and the interior of the rotary drum so that the inspection, maintenance and adjustments of the device and the charging of process solids may be facilitated.

3 Claims, 3 Drawing Figures

DEVICE FOR COATING GRANULAR SOLIDS

BACKGROUND OF THE INVENTION

The present invention relates to a device for coating granular solids such as tablets, catalyst carrying particles or the like.

There has been devised and demonstrated a rotary drum coating device of the type wherein the drum shell is formed with a large number of small holes for permitting the charging of gas into or discharging of gas from the rotary drum. In the device, such as that mentioned above, in order to discharge the coated granular solids, the drum shell is provided with a discharge damper operable by an air cylinder or the like. Alternatively, the rotary drum is inclined to discharge the coated granular solids. As a result, the coating device is very complex in construction, the maintenance is difficult, and the discharge of the products require a large number of labors and a long time. In order to solve this problem, there has been devised and demonstrated a coating device of the type wherein a discharge opening is formed through one of the side walls of the rotary drum, but the discharge still requires a long time.

In the coating devices of the types described, a coating material spraying nozzle and a blowing duct are extended through openings formed through one of the side walls of the rotary drum so that the maintenance thereof is still difficult.

SUMMARY OF THE INVENTION

In view of the above, one of the objects of the present invention is to provide a gas-permeable, rotary drum type coating device from which the coated granular solids may be automatically discharged in a very simple manner.

Another object of the present invention is to provide a coating device of the type described, wherein no obstacle is disposed in an opening formed through one side wall of a rotary drum so that the inspection, maintenance and adjustment of the device and the charging of process granular solids may be much facilitated.

To the above and other ends, briefly stated the present invention provides a device for coating granular solids comprising a rotary drum including a cylindrical section consisting of a plurality of overlapping circumferentially arcuated louvers radially spaced apart from each other at a suitable distance, side walls contiguous with said cylindrical section, at least one rotary shaft extending from one of said side walls; reversible drive means drivingly coupled to said rotary shaft for rotating said rotary drum in either direction; a casing encircling said rotary drum; coating material supply and spraying means for spraying a coating material within said rotary drum; and opening formed through said the other side wall; sealing means air-tightly dividing a space between said rotary drum and said casing into a gas supply passage and a gas exhaust passage; a gas supply duct in communication with said gas supply passage; and a gas exhaust duct in communication with said gas exhaust passage, whereby when said rotary drum is rotated in one direction the discharge of charged granular solids to be coated through the passages between said louvers to the exterior may be prevented whereas when the rotary drum is rotated in the other direction the coated granular solids may be discharged through the passages between the louvers from the interior of said rotary drum.

According to one aspect of the present invention, after the coating operation has been completed, the rotary drum is rotated in the reverse or the other direction so that the coated granular solids may be automatically discharged to the exterior through the passages between the louvers. Therefore the rapid and easy discharge of the coated granular solids may be effected without any provision of special means and without use of any special operation.

According to another aspect of the present invention, the coating material supply and spraying means consists of a nozzle communicated with a coating material source through a coating material supply pipe extending through the interior of the rotary shaft axially thereof of the rotary drum and the gas supply and exhaust ducts are communicated with the gas supply and exhaust passages between the rotary drum and the casing. Therefore there exists no obstacle in the inspection and charging opening so that the maintenance of the device, and the adjustment of the spraying nozzle and the batch charging may be much facilitated.

According to a further aspect of the present invention, the space between the cylindrical section of the rotary drum and the casing is divided into the gas supply and exhaust passages as described above, and the interior of the rotary drum is communicated with these gas supply and exhaust passage throughout its periphery through the passages defined by the adjacent louvers provided in the cylindrical section. In addition the gas supply and exhaust passages are communicated with the gas supply and exhaust ducts, respectively, as described above. Therefore the flow rate of a gas or air for drying coated granular solids may be remarkably increased so that the rapid drying operation may be effected without any variation in drying degree. Thus even with an aqueous coating material, the uniform coating may be attained. In addition, the coating capacity may be considerably increased as compared with the prior art coating devices of the equivalent size so that the capital coat may be saved to a considerable extent.

According to a further aspect of the present invention, a cleaning solution or the like may be charged into the casing and the rotary drum may be rotated in the opposite direction at a relatively lower speed so that the cleaning solution may well spread and be splashed by the louvers and consequently the cleaning of the device may be completed within a very short time period.

The above and other objects, features and advantages of the present invention will become more apparent from the following description of one preferred embodiment thereof taken in conjunction with the accompanying drawings.

DESCRIPTION OF THE PREFERRED EMBODIMENT

Figure 1:
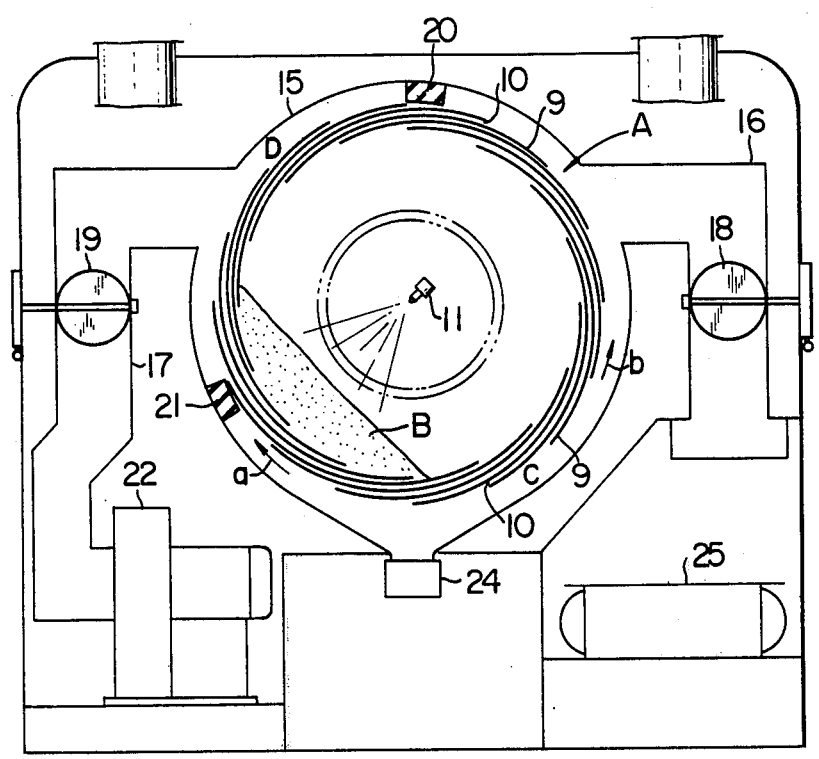
FIG. 1 is a longitudinal sectional front view of a preferred embodiment of a device for coating granular solids in accordance with the present invention.
Figure 2:
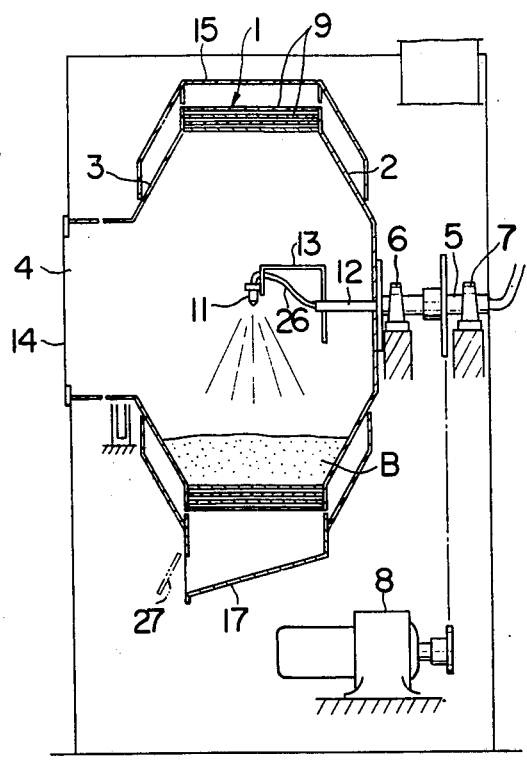
FIG. 2 is a vertical sectional side view thereof.

Referring to FIGS. 1 and 2, a coating machine in accordance with the present invention has a double-cone rotary drum generally indicated by the reference character A and comprised of a cylindrical section 1 and frustoconical side walls 2 and 3 contiguous therewith. The side wall 3 has a cylindrical section extending outwardly and coaxially of the rotary drum A and terminated into an inspection and charging hole 4 normally closed with a cover or door 14. The cylindrical section of the side wall 3 is rotatably supported by suitable means. The side wall 2 is connected to a rotary shaft 5 which is rotatably supported by horizontally spaced-apart bearings 6 and 7 and is drivingly coupled through a suitable reduction and transmission means to a reversible motor 8 so that the rotary drum A may be rotated either in the processing direction indicated by the arrow a or in the discharge direction indicated by the arrow b in FIG. 1.

The cylindrical section 1 of the rotary drum A consists of a plurality of overlapping circumferentially arcuate louvers 9 radially spaced apart from each other at a suitable distance, and arcuate passages 10 defined by the adjacent louvers 9 permit the air to flow therethrough into and out of the rotary drum A or the discharge of coated granular solids as will be described in detail hereinafter. Therefore the spacing between the adjacent louvers 9 must be so selected that the process solids may be smoothly discharged through these passages 10 when the rotary drum A is rotated in the discharge direction b. Therefore in order to determine the spacing, various factors must be taken into consideration, and of them two important factors are shapes and sizes of the coated solids. In like manner, the circumferential length of each louver 10 must be determined depending upon various factors which are for instance the diameter of the rotary drum A, and the configurations and dimensions of the louver passages 10, in order to prevent the discharge or escape of the process solids through the passages 10 when the rotary drum A is in the processing direction or remains stationary.

Disposed substantially at the center of the rotary drum A is a coating-material spraying nozzle 11 which is mounted on a bracket 13 and is communicated through a flexible tube 26 with a coating material supply pipe 12 extending through the interior of the rotary shaft 5 axially thereof and communicated with a coating material source (not shown).

The rotary drum A with the above construction is housed within a casing 15 which must be of an air-tight construction because of the pressure drop encountered in it as will be described in detail hereinafter. A substantially annular space defined between the rotary drum A and the casing 15 is divided by sealing members 20 and 21 which may be made of suitable elastic material and may be pressed against the louvers 9 of the rotary drum A, into air or gas supply passage C and exhaust passage D as best shown in FIG. 1. The air supply passage C is communicated with an air supply duct 16 with a damper 18, whereas the exhaust passage D is communicated through an exhaust duct 17 with an exhaust fan 22, a damper 19 being placed in the exhaust duct 17. In operation, the flow rates of air or gas flowing into and out of the rotary drum A may be suitably controlled by the dampers 18 and 19.

Figure 3:
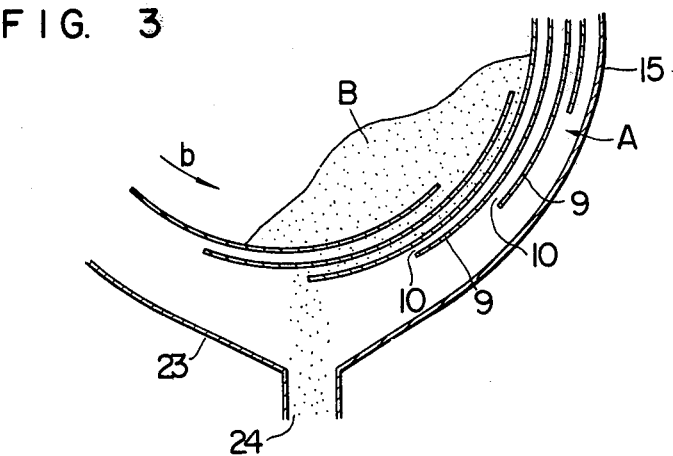
FIG. 3 is a fragmentary view, on enlarged scale, of FIG. 1 used for the explanation of the discharge of the coated granular solids.

As best shown in FIG. 3, the bottom of the casing 15 is formed into a funnel 23 which in turn is communicated with a discharge opening 24 so that the coated products may be smoothly discharged along the inclined surfaces into the discharge opening 24. As best shown in FIG. 2, the discharge opening 24 is air-tightly closed with a cover or door 27 during the coating operation in order to prevent the entrance of the air into the interior from the exterior.

Next the mode of operation of the coating machine with the above construction will be described. First process granular solids are charged into the interior of the rotary drum A through the inspection and charging opening 4, and after the cover 14 has been air-tightly closed, the motor 8 and the exhaust fan 22 are driven so that the rotary drum A is rotated in the processing direction a while the air flows into the supply passage C through the duct 16. As the rotary drum A rotates, a tumbling bed B of the process solids, of a lunar shape is formed therein, as best shown in FIG. 1, in which bed the process solids tumble, but the discharge thereof through the louver passages 10 is positively prevented because the louver passages 10 extend upwardly from the bottom of the bed B to the exterior of the drum A. The air flows from the supply passage C into the interior of the rotary drum A through the louver passages 10 and discharges into the exhaust passage D and hence into the exhaust duct 17 through the passages 10 between the louvers 9 below the tumbling bed B of process solids.

While the process solids are tumbling, the coating material is sprayed from the nozzle 11 so as to spread over the tumbling bed B, and the air continuously flows from the above toward the bed B. Thus the process solids may be uniformly coated and dried within a shorter period. Since the sprayed coating material is mainly concentrated toward the bed B, the adhesion thereof to the louvers 9 may be substantially eliminated and consequently the material loss may be minimized.

After the coating operation, the motor 8 is reversed to rotate the rotary drum A in the discharge direction b so that the bed B is caused to be conveyed by the louvers 9 in the opposite direction as best shown in FIG. 3 and consequently the coated solids may be automatically discharged through the louver passages 10, the funnel section 23 and the discharge opening 24.

According to the present invention, the coating material supply pipe 12 for supplying the coating material to the spray nozzle 11 is extended through the rotary shaft 5 and the air supply and exhaust ducts 16 and 17 are communicated with the annular passage defined between the casing 15 and the cylindrical section 1 of the rotary drum A. This means that there is no obstacle between the opening 4 on the side of the side wall 3 and the interior of the rotary drum A so that the inspection, maintenance and adjustment of the nozzle and other components and the charging of process solids may be much facilitated.

When it is desired to flow the heated air into the rotary drum A, a heat exchanger 25 (See FIG. 1) may be used for heating the air or gas to be drawn into the supply duct 16.

What we claim is:
1. A device for coating granular solids comprising
   a. a rotary drum including
      a cylindrical section consisting of a plurality of overlapping circumferentially arcuated louvers radially spaced apart from each other at a suitable distance, side walls contiguous with said cylindrical section, and at least one rotary shaft extending from one of said side walls;
   b. reversible drive means drivingly coupled to said rotary shaft for rotating said rotary drum in either direction, c. a casing encircling said rotary drum, d. coating material supply and spraying means for spraying a coating material within said rotary drum, e. an opening formed through said the other side wall, f. sealing means air-tightly dividing a space between said rotary drum and said casing into a supply passage and an exhaust passage, g. a gas supply duct in communication with said supply passage, and h. a gas exhaust duct in communication with said exhaust passage, whereby when said rotary drum is rotated in one direction the discharge or escape of charged granular solids to be coated through the passages between the louvers to the exterior may be prevented whereas when the rotary drum is rotated in the other direction, the coated granular solids may be discharged through the passages between the louvers from the interior of said rotary drum.

2. A device for coating granular solids as set forth in claim 1 wherein
said rotary drum has a horizontal axis of rotation, and said louvers are arrayed to overlap the succeeding louver outwardly thereof in said one direction in such a way that the passage defined by the adjacent louvers in one half section of said rotary drum divided by a vertical plane including the horizontal axis of rotation thereof may be directed upwardly circumferentially from the interior of said rotary drum to the exterior thereof whereas the passages defined by the adjacent louvers in the other half section may be directed downwardly circumferentially.

3. A device for coating granular solids as set forth in claim 1 wherein
said coating material supply and spraying means comprises
a nozzle disposed within said rotary drum, and
a coating material supply pipe extending through the interior of said rotary shaft axially thereof for communicating said nozzle with a coating material source.

* * * * *